Oct. 29, 1968
D. J. WARD
3,408,266
SUB-ATMOSPHERIC DISTILLATION OF A
BENZENE, TOLUENE, ETHYLBENZENE
STYRENE MIXTURE IN
A SINGLE COLUMN
Filed Nov. 22, 1966
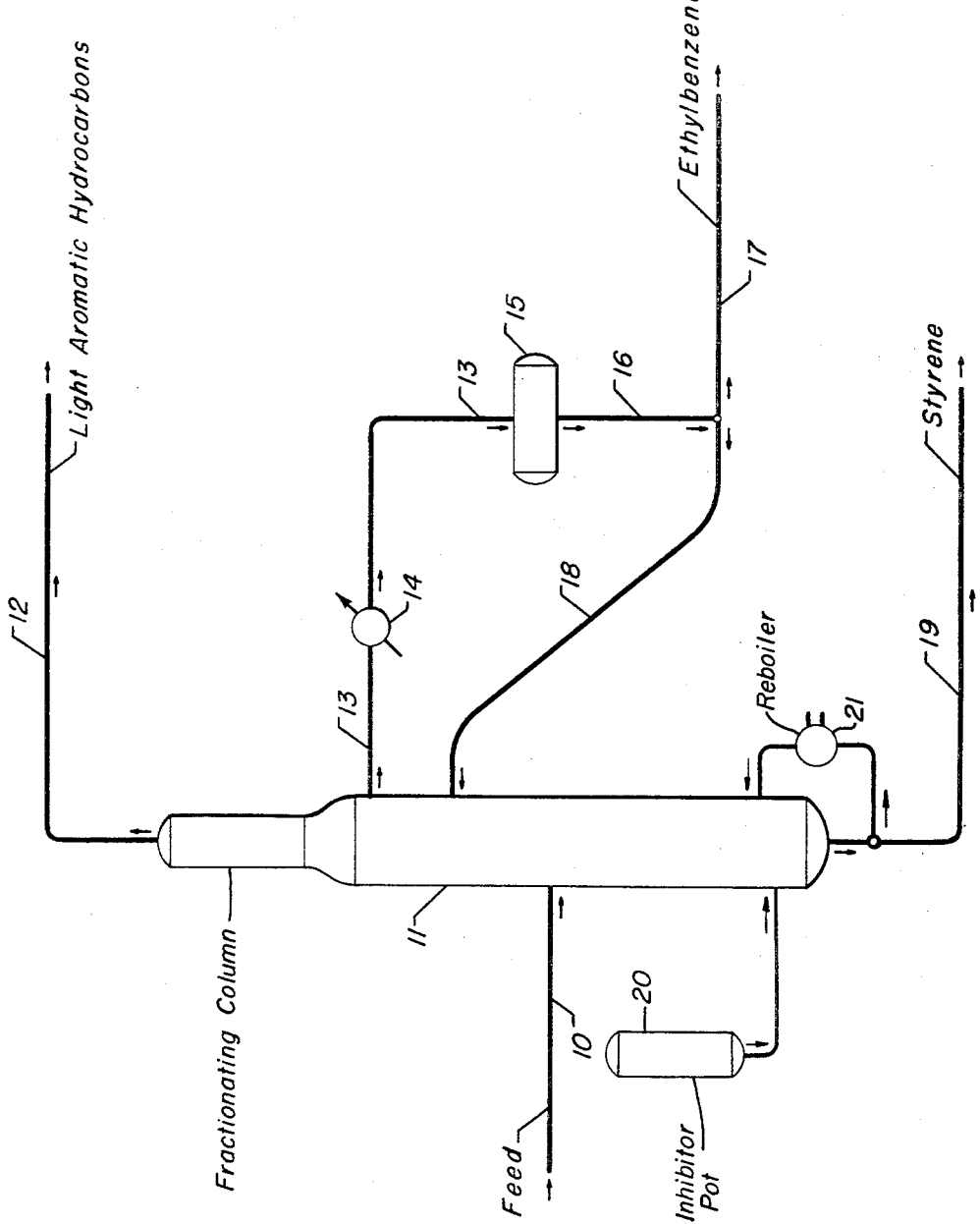
INVENTOR:
Dennis J. Ward
BY: *James R. Hoatson, Jr.*
*Joseph C. Mason, Jr.*
ATTORNEYS

United States Patent Office 3,408,266
Patented Oct. 29, 1968

3,408,266
SUB-ATMOSPHERIC DISTILLATION OF A BENZENE, TOLUENE, ETHYLBENZENE STYRENE MIXTURE IN A SINGLE COLUMN
Dennis J. Ward, Lombard, Ill., assignor to Universal Oil Products Company, Des Plaines, Ill., a corporation of Delaware
Filed Nov. 22, 1966, Ser. No. 596,137
4 Claims. (Cl. 203—9)

ABSTRACT OF THE DISCLOSURE

Method for distilling a mixture of benzene, toluene, ethylbenzene, and styrene in a single distillation column having a column bottoms temperature exceeding 220° F. Styrene in a purity from 95% to 99% by weight is recovered from the bottom of the distillation column. Ethylbenzene in high purity is recovered as a side-cut fraction from the column with benzene and toluene being removed as an overhead distillate fraction. The column is refluxed with a portion of the ethylbenzene.

---

This invention relates to a distillation method. It particularly relates to a method for separating styrene from the normally liquid effluent of an ethylbenzene dehydrogenation reaction zone. It specifically relates to a method for recovering styrene in high concentration from a feed mixture comprising benzene, toluene, ethylbenzene, and styrene via an improved distillation process.

It is well known in the art to produce styrene by the catalytic dehydrogenation of ethylbenzene in the presence of steam. The charge material to the dehydrogenation reaction is an ethylbenzene-rich stream which has been produced either from the catalytic alkylation of benzene with ethylene or has been separated from naturally occurring components which may be found in a typical petroleum refinery. The effluent from the dehydrogenation reaction contains styrene which is the result of converting the ethylbenzene to styrene at a rate of from 30 to 70 by weight per pass through the reaction zone. In addition to the styrene, the effluent contains unreacted ethylbenzene, benzene itself, toluene, hydrogen; and other light gases which have been produced as reaction products. Desirably, the styrene is to be recovered in not only high yield, but also in high concentration or purity.

Unfortunately, the boiling point of ethylbenzene and styrene are similar so that if distillation methods are used large fractionation columns with from 50 to 100 distillation trays are needed to effectuate the separation. More important, perhaps is the fact that benzene and toluene are also present in the effluent from the dehydrogenation reactor. The presence of these relatively light hydrocarbons in conjunction with the fact that styrene is to some extent at least heat polymerizable, necessitates that at least two columns be used to make the separation, with the benzene and toluene being separated in a prefractionation column operated under reduced pressure, and the ethylbenzene and styrene being separated in a second distillation column operating under still additional sub-atmospheric pressure in order to avoid the heat polymerization temperature normally associated with styrene.

The use of a distillation train comprising multiple distillation towers entails considerable expense and operating cost on behalf of an operator. Therefore, it would be highly desirable to simplify the separation of the various components found in a typical ethylbenezene dehydrogenation reactor effluent.

It is therefore an object of this invention to provide a fractionation method.

It is another object of this invention to provide a method for separating styrene from the normally liquid effluent of an ethylbenzene dehydrogenation reaction zone via an improved distillation process.

It is still another object of this invention to provide a method for recovering styrene in high concentration from a feed mixture comprising benzene, toluene, ethylbenzene, and styrene in a more economical and facile distillation manner.

These and other objects of the present invention will be apparent from the description presented hereinbelow and with reference to the appended drawing which is a schematic diagram illustrating one embodiment of this invention.

According to the present invention, a method for separating styrene from the normally liquid effluent of an ethylbenzene dehydrogenation reaction zone comprises passing said effluent into a single distillation column maintained under distillation conditions; withdrawing relatively light aromatic hydrocarbons from said column as an overhead fraction; withdrawing relatively medium aromatic hydrocarbons from said column as a side-cut fraction; and, withdrawing substantially pure styrene in high concentration from said column as a bottoms fraction.

Another embodiment of this invention includes the method wherein the distillation conditions embody sub-atmospheric pressure and a column bottom temperature exceeding 220° F.

A particular embodiment of this invention is a method for recovering styrene in high concentration from a feed mixture comprising benzene, toluene, ethylbenzene, and styrene which comprises: (a) introducing said mixture at a temperature from 60° F. to 200° F. into a single distillation column having from 40 to 120 distillation trays therein; (b) withdrawing from said column an overhead stream comprising benzene and toluene at a temperature from 90° F. to 160° F. and a pressure from 60 to 180 mm. Hg absolute; (c) withdrawing from said column a side-cut fraction comprising ethylbenzene at a temperature from 120° F. to 200° F.; (d) returning a portion of said overhead stream as reflux on the upper portion of said column; (e) returning a portion of said side-cut fraction as reflux on an intermediate portion of said column; (f) withdrawing from said column a bottoms fraction comprising styrene in high concentration; and (g) reboiling a portion of said bottoms fraction to maintain a temperature in the lower portion of said column from 220° F. to 260° F.

It can be seen from the above description that the present invention is a considerable improvement over the prior art by separating the various liquid components found in the effluent from an ethylbenzene dehydrogenation reaction zone in a single distillation column in contrast to the prior art schemes which have always required two or more distillation columns to make the same separation. The ability of the present invention to effectuate this separation in a single distillation column is predicated on the premise that styrene does not, in fact, necessarily polymerize at the temperature and pressure conditions taught by the prior art. The reasons behind this discovery are not now known; however, it was found that the styrene column bottoms temperature could be operated successfully at temperatures from 220° F. to 260° F. Preferably, the styrene column bottoms temperature should be operated at a temperature exceeding 220° F., but below that maximum temperature which causes significant styrene polymerization with attendant line plugging, heat exchanger fouling, etc.

The single distillation column contemplated by the present invention is one having from 40 to 120 distillation trays therein. These trays may be of any conventional type known to those skilled in the art, e.g., valve trays, sieve trays, and the like, as long as the pressure drop ($\Delta P$) per tray is no more than 4 mm. Hg absolute. Preferably, the pressure drop per tray should be in the range from 2 to 3 mm. Hg absolute.

The practice of the present invention will produce styrene at a purity in excess of 95% by weight, typically 99% by weight, with a recovery of the styrene in excess of 95%, and typically 99%. This means, of course, that even at the substantially elevated bottoms temperatures required in the practice of the present invention, styrene does not undergo any significant polymerization.

The distillation conditions used in the practice of this invention include an overhead pressure on the column from 60 to 180 mm. of Hg absolute, an overhead column temperature from 90° F. to 160° F., and a bottoms temperature from 220° F. to 260° F. Those skilled in the art familiar with the teachings included herein will know how to choose the optimum temperature required for best performance on the system in question. The design of the distillation should be such that the residence time in the column for the styrene portion of the feed material be in the range from 2 minutes to 40 minutes, preferably no more than about 10 minutes. It is believed that reducing the residence time in the tower for the styrene will reduce the chance of the styrene undergoing auto-polymerization by the elevated temperatures in the bottom of the column.

In addition, it is desirable practice to construct the distillation column so as to exclude the presence of oxygen or oxygen containing gases as much as posisble. On the other hand, those skilled in the art will know that if certain types of styrene polymerization inhibitors are used, the presence of a small amount of oxygen may not only be desirable, but may be required for the inhibitor to effectively stop the polymerization of styrene. The present invention still further contemplates the use of a relatively non-volatile styrene polymerization inhibitor, e.g., sulfur, as a further means of insuring control over the extent of styrene polymerization which may result in the practice of the present invention.

The invention may be more fully understood with reference to the appended drawing wherein feed comprising benzene, toluene, ethylbenzene, and styrene, typically derived from the effluent of an ethylbenzene dehydrogenation reaction zone, is passed into the process via line 10. The feed has been suitably heated to a temperature from 60° F. to 200° F., typically about 100° F., and is introduced into the single distillation column 11 which contains from 40 to 120 distillation trays, e.g., 70 trays. The tower is so constructed that the upper portion of the column is of smaller diameter than the main portion of the column since the vapor and liquid rates in this zone are significantly less than in the lower zones of the column than the separation between ethylbenzene and styrene.

Distillation column 11 is maintained under an overhead pressure from 60 to 180 mm. Hg absolute, preferably about 100 mm. Hg, an overhead temperature from 90° F. to 160° F., preferably about 105° F., and a bottoms temperature from 220° F. to 260° F., preferably in excess of 220° F., typically about 225° F. This bottoms temperature is maintained by suitable reboiler means not shown but more fully discussed hereinbelow.

Under the distillation conditions imposed on column 11, an overhead stream comprising benzene and toluene is removed from the column via line 12. These light aromatic hydrocarbons are subsequently condensed and passed into storage for further use; for example, the benzene portion may be recycled to the alkylation zone for further reaction with ethylene to produce additional ethylbenzene. Ethylbenzenes is removed from the column as a relatively medium aromatic hydrocarbon via line 13, is condensed in condenser 14 and passed into separation zone 15. The condensed ethylbenzene, at this point, may contain small amounts of toluene. However, in the practice of this invention, it has been found that the presence of toluene in this ethylbenzene stream in no way detracts from its desirable characteristics as a recycle stream to the dehydrogenation reaction zone. Accordingly, the distillation column 11 may be operated such that the light aromatic hydrocarbons being withdrawn via line 12 are substantially pure, e.g., substantially free of ethylbenzene, while the ethylbenzene being removed from the column via line 13 may contain significant amounts of toluene. In fact the distillation column 11 may be operated so as to have benzene as its only net product in line 12.

Since the separation of ethylbenzene and styrene is relatively difficult due to the close proximity of the respective boiling points, a suitable amount of ethylbenzene is passed via line 18 back into the column as reflux on the column to give sufficient condensation and rectification in the intermediate portion of distillation column 11. This ethylbenzene reflux is added to the column at an intermediate location in the column, preferably between the feed point and the withdrawal point for the benzene vapors. Generally, the reflux stream is returned at the same tray level as the withdrawal stream. However, other locations may be equally desirable and those skilled in the art are familiar with the techniques of determining where the proper reflux point should be on a distillation column.

Styrene in high concentration and high purity is removed from column 11 via line 19 and is substantially pure in form, e.g., substantially free of ethylbenzene. As previously mentioned, the bottoms temperature in column 11 must exceed 220° F., and typically is maintained at a temperature of about 225-230° F. It was surprising to find that at these elevated temperatures styrene does not in fact undergo significant polymerization which would obviate the desirability of operating the column under the conditions contemplated herein. The styrene bottoms fraction in line 19 is passed, preferably, into a small recovery column for removal of the inhibitor which had been added in distillation column 11 via inhibitor pot 20 and to remove any tars and polymers which may have been formed during this operational step. However, it was also found that the amount of tars and polymers was significantly less than that associated with the prior art processes so that the subsequent styrene recovery column may be considerably smaller in design and more economical to operate. These subsequent means are well known to those skilled in the art and have not been shown as part of the invention contemplated herein. Also, as previously mentioned, a portion of the styrene bottoms material in line 19 is reboiled by means of reboiler 21 in order to maintain the proper bottoms temperature of, for example, 230° F.

The invention as now described effectuates considerable economies over the prior art processes. It is obvious that the use of a single distillation column to effectuate the separation of the components in a typical ethylbenzene dehydrogenation reactor effluent is significantly less to erect in terms of capital costs, and significantly less in terms of utility costs for operating expenses.

As used herein the term "substantially pure styrene" is intended to encompass styrene which contains small amounts (less than 2% by weight) of ethylbenzene, if any. It is recognized that styrene as a bottoms product from the columns will contain, for example, some polymer, tar, and, if one is used, the polymerization inhibitor such as elemental sulfur. These non-ethylbenzene contaminants may be removed in a subsequent treating operation such as a flash pot, recovery column, crystallization means, etc.

The invention claimed:
1. Method for separating styrene from the normally liquid effluent of an ethylbenzene dehydrogenation reaction zone via distillation without significant polymer formation within the distillation zone which comprises:
 (a) passing said effluent into a single distillation column maintained under distillation conditions including sub-atmospheric pressure and a column bottoms temperature exceeding 220° F.;
 (b) withdrawing relatively light aromatic hydrocarbons comprising benzene and toluene from said column as an overhead fraction;

(c) withdrawing relatively medium aromatic hydrocarbons comprising ethylbenzene from said column as a side-cut fraction; and, (d) withdrawing substantially pure styrene in high concentration from said column as a bottoms fraction.

2. Method according to claim 1 wherein said distillation conditions include an overhead pressure from 60 to 180 mm. Hg absolute, an overhead temperature from 90° F. to 160° F., and a bottoms temperature from 220° F. to 260° F.

3. Method for recovering styrene in high concentration from a feed mixture comprising benzene, toluene, ethylbenzene, and styrene which comprises:

(a) introducing said mixture at a temperature from 60° F. to 200° F. into a single distillation column having from 40 to 120 distillation trays therein;

(b) withdrawing from said column an overhead stream comprising benzene and toluene at a temperature from 120 F. to 200° F. and a pressure from 60 to 180 mm. Hg absolute;

(c) withdrawing from said column a side-cut fraction comprising ethylbenzene at a temperature from 130° F. to 200° F.;

(d) returning a portion of said overhead stream as reflux in the upper portion of said column;

(e) returning a portion of said side-cut fraction as reflux on an intermediate portion of said column;

(f) withdrawing from said column a bottoms fraction comprising styrene in high concentration; and, (g) reboiling a portion of said bottoms fraction to maintain a temperature in the lower portion of said column from 220° F. to 260° F.

4. Method according to claim 3 wherein said portion of bottoms fraction is reboiled in the presence of relatively non-volatile styrene polymerization inhibitor.

References Cited

UNITED STATES PATENTS

| 2,240,764 | 5/1941 | Dreisbach et al. | 203—9 |
| 2,398,689 | 4/1946 | Bloomer | 260—669 |
| 2,411,106 | 11/1946 | Petry et al. | 260—669 |
| 3,209,044 | 9/1965 | Meek et al. | 260—669 |

WILBUR L. BASCOMB, *Primary Examiner.*